United States Patent
Rice et al.

(10) Patent No.: US 11,175,417 B1
(45) Date of Patent: Nov. 16, 2021

(54) MUTLI-LAYERED NEUTRON DETECTOR

(71) Applicant: National Technology & Engineering Solutions of Sandia, LLC, Albuquerque, NM (US)

(72) Inventors: William Charles Rice, Torrance, CA (US); Matthew Jordan, Albuquerque, NM (US); James Ewers Levy, Albuquerque, NM (US); David P. Adams, Albuquerque, NM (US); Douglas R. Nichols, Albuquerque, NM (US); Richard Karl Harrison, Albuquerque, NM (US); Liam D. Claus, Albuquerque, NM (US); Daniel J. Dorsey, Sandia Park, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 42 days.

(21) Appl. No.: 16/587,580

(22) Filed: Sep. 30, 2019

(51) Int. Cl.
*G01T 3/06* (2006.01)

(52) U.S. Cl.
CPC ..................... *G01T 3/06* (2013.01)

(58) Field of Classification Search
CPC .............. G01T 3/06; G01T 3/00; G01T 3/008
See application file for complete search history.

(56) References Cited

U.S. PATENT DOCUMENTS

| | | | | | |
|---|---|---|---|---|---|
| 2,798,847 | A | * | 7/1957 | Fermi | G21C 1/06 376/219 |
| 5,399,863 | A | * | 3/1995 | Carron | G01T 3/08 250/370.05 |
| 5,500,534 | A | * | 3/1996 | Robinson | G01T 1/185 250/374 |
| 5,726,453 | A | * | 3/1998 | Lott | G01T 3/08 250/370.05 |
| 5,880,471 | A | * | 3/1999 | Schelten | H01L 31/115 250/370.05 |
| 5,940,460 | A | * | 8/1999 | Seidel | G01T 3/08 250/370.01 |
| 7,164,138 | B2 | | 1/2007 | McGregor et al. | |

(Continued)

OTHER PUBLICATIONS

A.N. Caruso, "The Physics of Solid-State Neutron Detector Materials and Geometries," J. Phys.: Condens Matter, Oct. 22, 2010, DOI: 10.1088/0953-8984/22/44/443201, 32 pages.

(Continued)

*Primary Examiner* — David P Porta
*Assistant Examiner* — Djura Malevic
(74) *Attorney, Agent, or Firm* — Madelynne J. Farber; Mark A. Dodd (57) ABSTRACT

A neutron detector including a plurality of layers of converter material and a plurality of layers of detector material. Each layer of converter material can be immediately adjacent to at least one layer of detector material and each layer of detector material can be immediately adjacent to at least one layer of converter material. The neutron detector may further include a read out integrated circuit (ROIC) that is electrically coupled to the plurality of layers of detector material. A value output by the ROIC may be indicative of a neutron interacting with a layer of converter material from amongst the plurality of layers of converter material.

20 Claims, 6 Drawing Sheets

(56) References Cited

U.S. PATENT DOCUMENTS

| | | | |
|---|---|---|---|
| 7,244,947 B2 * | 7/2007 | Polichar | G01T 3/06 250/367 |
| 7,271,389 B2 * | 9/2007 | August | G01T 3/08 250/370.05 |
| 7,372,009 B1 * | 5/2008 | Losee | G01T 3/08 250/200 |
| 7,372,040 B2 * | 5/2008 | Polichar | G01T 3/06 250/390.01 |
| 7,372,041 B1 * | 5/2008 | Nagarkar | G01T 3/06 250/390.11 |
| 7,518,119 B2 * | 4/2009 | Friedman | C22C 19/05 250/374 |
| 8,022,369 B2 * | 9/2011 | Orava | G01T 3/08 250/370.05 |
| 8,183,537 B1 * | 5/2012 | Rhiger | G01T 3/04 250/391 |
| 8,258,483 B1 | 9/2012 | Boatner et al. | |
| 8,399,849 B1 * | 3/2013 | Krishnan | G01T 3/06 250/390.01 |
| 8,569,708 B2 * | 10/2013 | Stradins | G01T 3/08 250/370.05 |
| 8,698,088 B2 * | 4/2014 | Kusner | G01T 1/2008 250/369 |
| 8,748,830 B2 * | 6/2014 | Kusner | G01T 1/20 250/367 |
| 8,803,066 B2 * | 8/2014 | Hossain | H01L 27/1462 250/214.1 |
| 9,029,792 B2 | 5/2015 | Stradins et al. | |
| 9,395,454 B2 * | 7/2016 | Orava | G01T 3/08 |
| 9,568,623 B2 * | 2/2017 | Sahu | G01T 3/06 |
| 9,590,128 B2 * | 3/2017 | Cauffiel | G01T 3/08 |
| 9,645,257 B2 * | 5/2017 | Kusner | G01T 3/06 |
| 9,651,689 B2 * | 5/2017 | Gendotti | G01T 3/06 |
| 9,851,454 B2 * | 12/2017 | Cao | G01T 1/20 |
| 9,923,115 B2 * | 3/2018 | Cauffiel | H01L 31/115 |
| 10,274,619 B2 * | 4/2019 | Gendotti | G01T 3/06 |
| 10,295,681 B2 * | 5/2019 | Taguchi | G01T 1/2002 |
| 10,302,780 B2 * | 5/2019 | Inglis | H01J 47/1211 |
| 10,859,718 B1 * | 12/2020 | Nagarkar | G01N 23/09 |
| 2003/0152186 A1 * | 8/2003 | Jurczyk | G21K 5/04 376/109 |
| 2003/0155530 A1 * | 8/2003 | Adnani | A61N 5/10 250/491.1 |
| 2003/0165211 A1 * | 9/2003 | Grodzins | G01T 3/06 376/155 |
| 2004/0061047 A1 * | 4/2004 | Bolozdynya | G01T 3/008 250/251 |
| 2004/0164250 A1 * | 8/2004 | Cork | G01T 1/169 250/390.06 |
| 2005/0023479 A1 * | 2/2005 | Grodzins | G01T 3/06 250/390.11 |
| 2005/0082489 A1 * | 4/2005 | August | G01T 3/08 250/370.05 |
| 2005/0258372 A1 * | 11/2005 | McGregor | G01T 1/185 250/390.01 |
| 2007/0102647 A1 * | 5/2007 | Johnson | G01T 3/06 250/390.11 |
| 2008/0017804 A1 * | 1/2008 | Krishnamoorthy | G01T 3/08 250/370.05 |
| 2009/0045348 A1 * | 2/2009 | Stuenkel | G01T 3/06 250/390.11 |
| 2009/0050810 A1 * | 2/2009 | Nagarkar | G01T 1/202 250/361 R |
| 2009/0175412 A1 * | 7/2009 | Grodzins | G01T 3/06 378/57 |
| 2009/0302226 A1 | 12/2009 | Schieber et al. | |
| 2011/0024634 A1 * | 2/2011 | Shah | C09K 11/778 250/362 |
| 2011/0049379 A1 * | 3/2011 | Moses | G01T 3/08 250/390.01 |
| 2011/0127527 A1 * | 6/2011 | Kub | G01T 3/08 257/43 |
| 2011/0163242 A1 * | 7/2011 | Mao | G01T 3/08 250/390.01 |
| 2011/0266643 A1 * | 11/2011 | Engelmann | G01T 3/08 257/429 |
| 2011/0291014 A1 * | 12/2011 | Kusner | G01T 1/20 250/362 |
| 2012/0326043 A1 * | 12/2012 | Duraj | G01T 3/06 250/362 |
| 2013/0015363 A1 * | 1/2013 | Orava | G01T 3/08 250/390.11 |
| 2013/0146775 A1 * | 6/2013 | Ramsden | G01T 3/06 250/362 |
| 2013/0187056 A1 * | 7/2013 | Nikolic | G01T 3/008 250/370.05 |
| 2013/0193329 A1 * | 8/2013 | Srivastava | C09K 11/772 250/361 R |
| 2013/0234031 A1 * | 9/2013 | Frank | G01T 5/08 250/366 |
| 2013/0267056 A1 * | 10/2013 | Fushie | H01L 31/115 438/56 |
| 2013/0292685 A1 * | 11/2013 | Jiang | H01L 31/1085 257/76 |
| 2013/0344636 A1 * | 12/2013 | Bellinger | H01L 31/18 438/56 |
| 2014/0042330 A1 * | 2/2014 | Gozani | G01V 5/0075 250/367 |
| 2014/0077089 A1 * | 3/2014 | Orava | G01T 3/06 250/370.05 |
| 2014/0091227 A1 * | 4/2014 | Yang | G01T 3/06 250/367 |
| 2014/0151566 A1 * | 6/2014 | Ramsden | G01T 3/001 250/366 |
| 2014/0252520 A1 * | 9/2014 | Dahal | G01T 3/00 257/429 |
| 2014/0264057 A1 * | 9/2014 | Cress | G01T 3/08 250/390.11 |
| 2014/0306117 A1 * | 10/2014 | Vacheret | G01T 3/06 250/366 |
| 2014/0374606 A1 * | 12/2014 | Gendotti | G01T 1/2008 250/361 R |
| 2015/0053863 A1 * | 2/2015 | Cao | H01L 31/03044 250/370.05 |
| 2015/0060686 A1 * | 3/2015 | DeVolpi | G21D 1/00 250/390.1 |
| 2015/0241578 A1 * | 8/2015 | Menge | B29C 48/495 250/486.1 |
| 2015/0247937 A1 * | 9/2015 | Cortesi | G01T 3/003 250/389 |
| 2015/0287872 A1 * | 10/2015 | Cauffiel | H01L 31/115 250/370.05 |
| 2016/0139280 A1 * | 5/2016 | Sahu | G01T 3/06 250/390.11 |
| 2016/0266262 A1 * | 9/2016 | Fukuda | G01T 3/06 |
| 2017/0184736 A1 * | 6/2017 | Ramsden | G01V 5/0091 |
| 2017/0276810 A1 * | 9/2017 | Clarke | G01T 3/08 |
| 2017/0329028 A1 * | 11/2017 | Kunimoto | A61N 5/10 |
| 2018/0024256 A1 * | 1/2018 | Gendotti | G01T 3/06 250/390.11 |
| 2018/0156930 A1 * | 6/2018 | Taguchi | G01T 3/06 |
| 2018/0172852 A1 * | 6/2018 | Newman | G01T 1/2008 |
| 2018/0172853 A1 * | 6/2018 | Newman | G01T 3/06 |
| 2018/0196146 A1 * | 7/2018 | Fukuta | C09K 11/7774 |
| 2019/0033473 A1 * | 1/2019 | Jakubek | G01T 1/2018 |

OTHER PUBLICATIONS

K.B. Pfeifer, "Microfabrication of a Gadolinium-Derived Solid-State Sensor for Thermal Neutrons," Journal of Radiation Research, 2017, pp. 464-473, vol. 58, No. 4.

* cited by examiner

MUTLI-LAYERED NEUTRON DETECTOR

STATEMENT OF GOVERNMENTAL INTEREST

This invention was made with Government support under Contract No. DE-NA0003525 awarded by the United States Department of Energy/National Nuclear Security Administration. The U.S. Government has certain rights in the invention.

BACKGROUND

Conventionally, neutron detectors employ an isotope of helium gas, e.g. helium-3, to detect presence of a neutron. However, tubes used to contain the helium-3 are large and require a relatively high voltage for operation. In addition, availability of helium-3 is limited. To address deficiencies of such neutron detectors, solid-state neutron detectors have been developed, wherein such detectors include a layer of high neutron cross-section materials. However, these solid-state neutron detectors may have a lower detection efficiency than detectors that comprise helium-3. To increase detection efficiency in solid-state neutron detectors, the surface area of the layer of high neutron cross-section material can be increased, thereby increasing the number of neutrons that interact with the layer. However, this increased surface area results in a large and cumbersome neutron detector, and detector efficiency remains relatively low.

SUMMARY

The following is a brief summary of subject matter that is described in greater detail herein. This summary is not intended to be limiting as to the scope of the claims.

In an exemplary embodiment, described herein is a neutron detector. The neutron detector includes a plurality of layers of converter material and a plurality of layers of detector material. Each layer of converter material may be immediately adjacent to at least one layer of detector material and each layer of detector material may be immediately adjacent to at least one layer of converter material. The neutron detector further includes a read out integrated circuit (ROIC) that is electrically coupled to the plurality of layers of detector material. A value output by the ROIC is indicative of a neutron interacting with a layer of converter material from amongst the plurality of layers of converter material.

A method of assembling a neutron detector includes the step of depositing a layer of converter material onto a layer of detector material. The method further includes securing a second layer of detector material to a surface of the deposited layer of converter material. The method yet further includes depositing a second layer of converter material onto the second layer of detector material. The method also includes electronically coupling a read out integrated circuit (ROIC) to the layer of detector material and the second layer of detector material. A value output by the ROIC is indicative of a neutron interacting with at least one of the layer of converter material or the second layer of converter material.

Further, in accordance with various aspects, described herein is a neutron detector. The neutron detector includes a plurality of layers of boron-10 and a plurality of layers of silicon. Each layer of boron-10 generates an alpha particle when a neutron interacts with the layer of boron-10 by nuclear reaction. Each layer of silicon can detect presence of the alpha particle. Each layer of boron-10 is immediately adjacent to at least one layer of silicon and each layer of silicon is immediately adjacent to at least one layer of boron-10. The neutron detector further includes a read out integrated circuit (ROIC) that is electrically coupled by through-silicon vias to each of the plurality of layers of silicon wafers. A value output by the ROIC is indicative of detection of the alpha particle by a layer of silicon wafer from amongst the plurality of layers of silicon wafers.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Various technologies pertaining to neutron detectors are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details.

In reference to the disclosure herein, for purposes of convenience and clarity only, directional terms, such as, top, bottom, left, right, up, down, upper, lower, over, above, below, beneath, rear, and front, may be used. Such directional terms should not be construed to limit the scope of the features described herein in any manner. It is to be understood that embodiments presented herein are by way of example and not by way of limitation. The intent of the following detailed description, although discussing exemplary embodiments, is to be construed to cover modifications, alternatives, and equivalents of the embodiments as may fall within the spirit and scope of the features described herein.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Additionally, as used herein, the term "exemplary" is intended to mean serving as an illustration or example of something and is not intended to indicate a preference.

Disclosed is an apparatus for detecting presence of one or more neutrons. The disclosed apparatus comprises a stack of layers which includes multiple layers of converter material that can detect a neutron. The layers are arranged such that even if a neutron passes through a first layer of converter material undetected, the neutron may be detected by a subsequent layer of converter material in the stack of layers.

Figure 1:
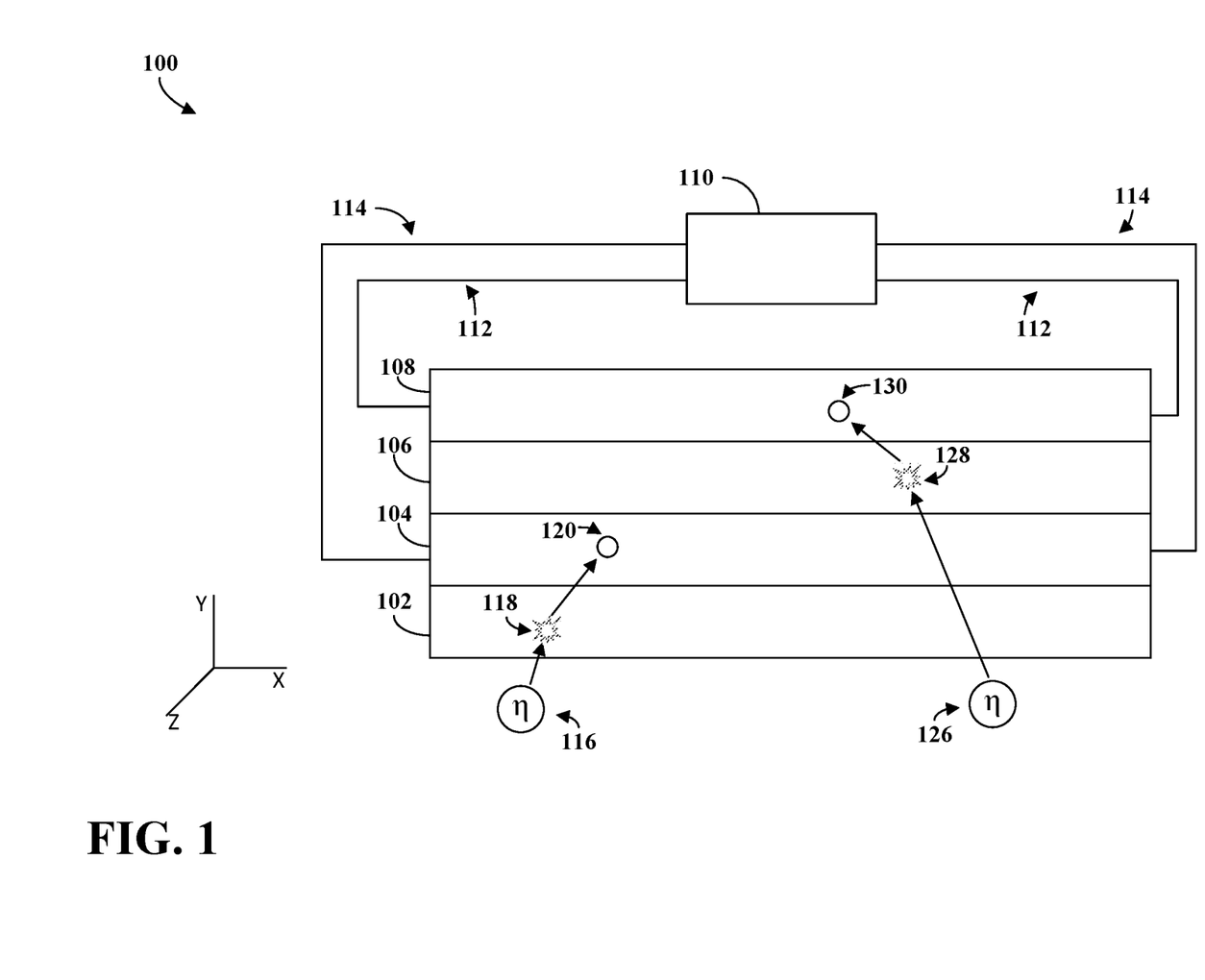
FIG. 1 illustrates an exemplary neutron detector.

Turning to FIG. 1, illustrated is one embodiment of an apparatus 100 for detecting neutrons. The neutron detector 100 can detect thermal neutrons and/or fast neutrons, wherein a type of converter material is selected based upon whether the neutron detector 100 is configured to detect thermal neutrons and/or fast neutrons, as described in detail below. Conventionally, a solid-state neutron detection apparatus comprises a single layer of converter material that is associated with a layer of detector material. The converter material reacts with an incoming neutron to create a charged particle which is then received in the layer of detector material. The neutron detection apparatus then outputs a value indicative of this interaction. However, not all incoming neutrons may react with the layer of converter material and a portion of incoming neutrons may pass through the layer of converter material without causing a reaction, thus going undetected. In order to detect a sufficient number of neutrons, the conventional neutron detector has a large surface area so that a relatively large number of neutrons pass through the layer of converter material, thereby increasing chances one of the neutrons may react with the converter material and thus be detected.

By comparison, as illustrated in FIG. 1, the neutron detector 100 comprises stacked layers of converter material and layers of detector material. Therefore, even if a neutron passes through a first layer of converter material in a stack without interacting therewith, the neutron may interact with a subsequent layer of converter material in the stack, thus increasing the chances of detection of the neutron. Accordingly, the neutron detector 100 has increased detection efficiency when compared to the conventional neutron detector.

In each of the following embodiments, the neutron detector 100 has equal numbers of layers of converter material and layers of detector material, i.e. for each layer of converter material there is a layer of detector material. However, it is envisioned that the neutron detector can include a number of layers of converter material that is different from a number of layers of detector material. In one embodiment, the stacked layers of converter material and layers of detector material are arranged such that each layer of converter material is immediately adjacent one layer of detector material and/or each layer of detector material is immediately adjacent one layer of converter material. However, the layer(s) of converter material and/or layer(s) of detector material can be stacked in any suitable order.

In the illustrated embodiment, the neutron detector 100 comprises two layers of converter material and two layers of detector material. However, the neutron detector 100 can comprise any number of layers of converter material and/or layers of detector material. In one example, the neutron detector 100 comprises 40 layers, which may comprise 20 layers of converter material and 20 layers of detector material.

In the illustrated embodiment, the stacked layers comprise a first layer of converter material 102 that is associated with a first layer of detector material 104, collectively referred to herein as the first layers 102 and 104. The first layers 102 and 104 are stacked on a second layer of converter material 106 that is associated with a second layer of detector material 108, thus forming a stack of layers 102-108. The stack of layers 102-108 can be arranged such that a layer of converter material is sandwiched between two layers of detector material. More particularly, in the illustrated embodiment, the second layer of converter material 106 is layered between the first layer of detector material 104 and the second layer of detector material 108.

A layer of converter material (e.g., the first layer of converter material 102) can be attached to a layer of detector material (e.g., the first layer of detector material 104) via any suitable process. For example, the layer of converter material can be deposited on the layer of detector material via direct current, magnetron sputtering, etc.

In operation, an incoming neutron may interact with and/or be captured by a layer of converter material that is within the stack of layers 102-108 (e.g., the first layer of converter material 102, the second layer of converter material 106, etc.). The neutron may be captured through reaction with the converter material; this reaction generates a reaction product that is then detectable by a layer of detector material within the stack of layers 102-108. The reaction product can comprise any suitable product detectable by the detector material. For example, the reaction product can comprise light particles (photons), alpha particles, high energy electrons, high energy lithium nuclei, tritium particles, other heavier particles, and/or the like. In one embodiment, the reaction product is generated via a nuclear reaction between the neutron and the converter material. The reaction between the neutron and the converter material can comprise any suitable reaction type for generating a reaction product.

In one embodiment, the converter material can comprise a material with a high-neutron cross-section. The converter material can comprise any suitable material for reacting with the neutron. For instance, the converter material can comprise at least one of boron-10, lithium-6, gadolinium, helium-3, uranium, and/or the like. The type of material used for the layer of converter material may be selected based on the type of neutron that is to be detected. For instance, the layer of converter material for thermal neutrons can consist of a material that generates high energy alpha particles, high energy tritium particles, and/or high energy electrons when a neutron interacts with the layer of converter material. Whereas, the layer of converter material for fast neutrons can consist of material that has a concentration of hydrogen.

In one embodiment, the same material is used in each layer of converter material in the neutron detector 100. In another embodiment, the material used in the layers of converter material in the neutron detector 100 vary, i.e. the first layer of converter material 102 comprises a first material and the second layer of converter material 106 comprises a second different material.

The layer of detector material is configured to produce a measurable signal in response to detecting the reaction product of a reaction between the neutron and a layer of converter material. Any suitable material may be used for forming the layer of detector material. For instance, the layer of detector material may comprise a semiconductor device. In an embodiment, the layer of detector material may include one or more photodiodes that may be arranged in the layer of detector material. The photodiodes can be arranged in any suitable location and/or pattern in the layer of detector material.

The photodiode can comprise semiconducting material. The semiconducting material can include silicon, cadmium telluride, diamond-like carbon, gallium arsenide, aluminum gallium nitride, and/or the like. In one embodiment, the same material is used for each photodiode in one layer of detector material. In another embodiment, the material used for the photodiodes in one layer of detector material may vary. The type of material used for a select photodiode and/or photodiodes may also be chosen based on the type of reaction product to be detected. Adjacent photodiodes in a layer of detector material may be bonded together using any suitable process, for instance a wafer-bonding technique.

The illustrated neutron detector 100 further includes a read out integrated circuit (ROIC) 110 that is electronically coupled to one or more of the layers of the stack of layers 102-108. The ROIC 110 outputs a value(s) that is indicative of a neutron interacting with a layer of converter material. More particularly, the ROIC 110 outputs a value(s) indicative of the measurable signal produced by the layer of detector material. To this end, the ROIC 110 can be electronically coupled to any suitable layer from amongst the stack of layers 102-108. In the embodiment illustrated in FIG. 1, the ROIC 110 is electronically coupled to the first layer of detector material 104 as illustrated schematically by lines 114. In the illustrated embodiment, the ROIC 110 is further electronically coupled to the second layer of detector material 108 as illustrated schematically by lines 112.

The ROIC 110 can be electronically coupled to one or more of the layers of the stack of layers 102-108 and/or a layer of detector material (e.g., the first layer of detector material 102, the second layer of detector material 106, etc.) via any suitable connection setup. For example, one or more contacts, which are connected to the ROIC 110 via traces or leads, can be placed on either side of the layer of detector material. In one version, a voltage can be applied to the layer of detector material via the contacts causing a current flow in the layer of detector material which can vary in the presence of the reaction product; this variance can be detected by the ROIC 110. In another version, a current that is generated in the layer of detector material in response to presence of the reaction product can be detected by the ROIC 110 via the one or more contacts.

In another embodiment, through-silicon vias (TSVs) are used to conduct wire traces from the one or more of the photodiodes in the individual layers of detector material to the ROIC 110. TSVs allow for vertical interconnection between stacked layers of detector material (e.g., semiconductor wafers). In TSVs, a hole is bored through each individual photodiode in a stack and a metal line is run through the hole passing through the photodiodes from one to another to connect the stacked photodiodes. An insulator may be used in TSVs to prevent shorting out of one or more of the connected photodiodes.

The ROIC 110 can comprise any suitable read out electronic and may comprise a charge-sensitive pre-amplifier and a shaping amplifier optimally tuned for signal discrimination. The ROIC 110 can be placed in any suitable location relative to the stack of layers 102-108. For instance, in the embodiment illustrated in FIG. 1, the ROIC 110 is separate from the stack of layers 102-108. In another embodiment, multiple ROICs may be used and one or more of the ROICs can be placed on layer of detector material adjacent to a connected photodiode or photodiodes.

The value output by the ROIC 110 can also indicate information regarding the neutron detector 100 and/or the neutron that interacts with the layer of converter material. For example, the value output can indicate which layer of converter material from the stack of layers 102-108 interacted with the neutron. In another example, the value output can indicate which layer of detector material from the stack of layers 102-108 detected the reaction product. In a yet further example, the value output by the ROIC 110 can indicate the type of neutron that interacted with the layer of converter material.

Incoming neutrons may interact with one or more of the layers in the stack of layers 102-108. Due to the stacked nature of the present neutron detector 100, even if a neutron passes through a first layer of converter material in a stack without interacting therewith it may interact with a subsequent layer of converter material in the stack, thus increasing the chances the neutron will be detected.

In an embodiment, as illustrated in FIG. 1, a first incoming neutron 116 interacts with the first layer of converter material 102 while a second incoming neutron 126 passes through the first layer of converter material 102 undetected. The interaction between the first neutron 116 and the first layer of converter material 102, illustrated at 118, generates a reaction product 120. This reaction product 120 can then be detected by the first layer of detector material 104. The ROIC 110 then outputs a value indicative of the first neutron 116 interacting with the first layer of converter material 102.

In a conventional neutron detector, because the second neutron 126 passed through the first layer of converter material 102 without interaction, the second neutron 126 would go entirely undetected. By comparison, due to the stacked nature of the neutron detector 100, this second neutron 126 may be detected by one of the subsequent layers. The interaction between the second neutron 126 and the second layer of converter material 106, illustrated at 128, generates a reaction product 130. This reaction product 130 can then be detected by the second layer of detector material 108. The ROIC 110 can then output a value indicative of the second neutron 126 interacting with the second layer of converter material 106.

The neutron detector 100 may further include one or more layers of material that alter physical characteristics of the stack of layers 102-108. In one embodiment, a layer of material is used to reduce residual stress within one or more of the layers in the stack of layers 102-108 that is generated during manufacture of the neutron detector 100. For instance, when attaching a layer of converter material onto a layer of detector material residual stresses may form in the layer of converter material which can cause the layer of converter material to flake off from the layer of detector material.

Figure 2:
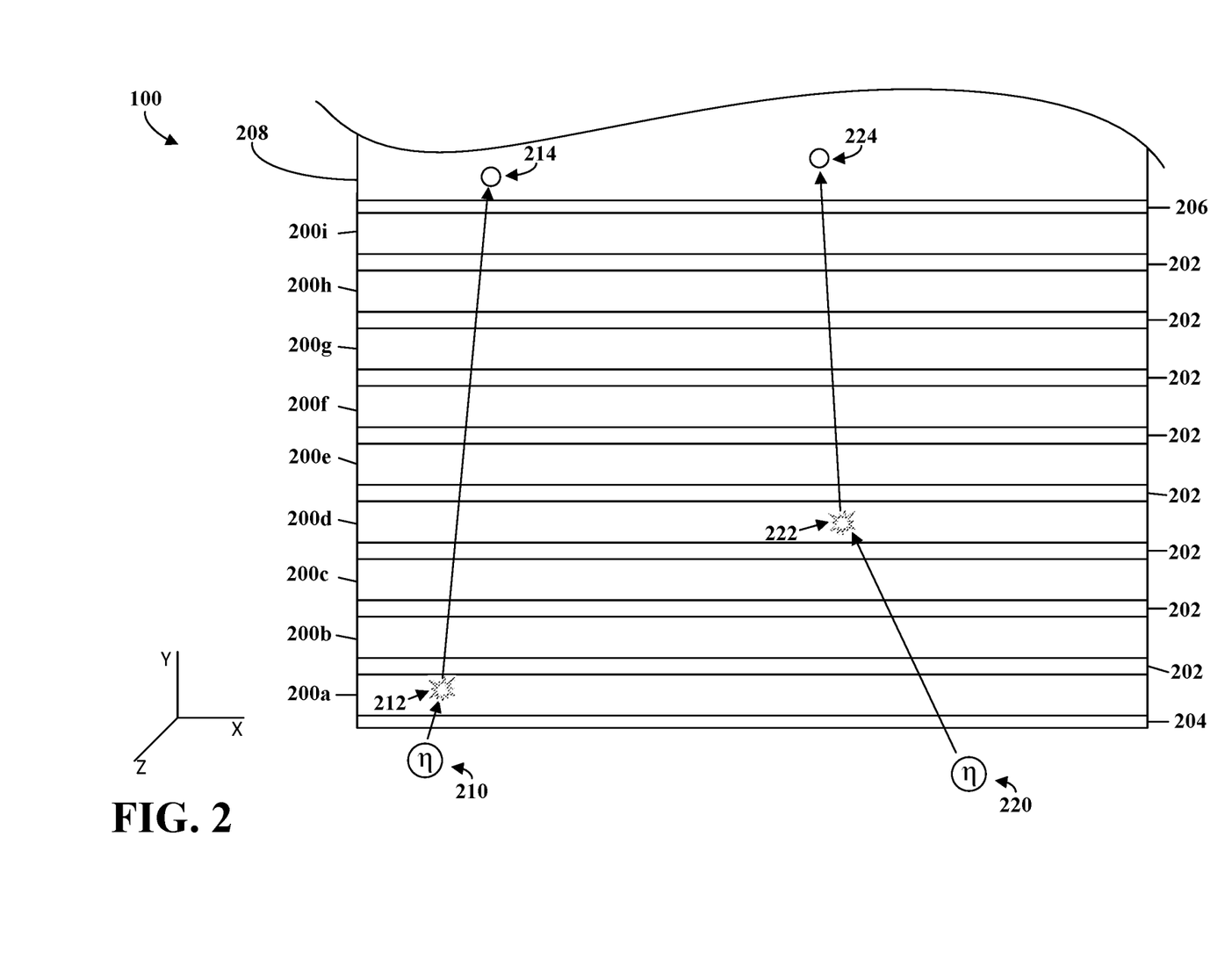
FIG. 2 illustrates another exemplary neutron detector.

In an embodiment illustrated in FIG. 2, a layer of residual stress reduction material 202 is placed between two portions of a layer of converter material (e.g., the first layer of converter material 102 or the second layer of converter material 106). Any number of layers of residual stress reduction material 202 may be utilized in the neutron detector 100. For instance, as illustrated in FIG. 2, multiple layers of residual stress reduction material 202 may be used in the one layer of converter material 200 resulting in multiple portions 200a-i that are each separated by a layer of residual stress reduction material 202.

Because the layer of converter material 200 was separated into multiple portions 200a-i, incoming neutrons may interact with different portions. For instance, a first neutron 210 interacts with a first portion 200a of the layer of converter material 200. The interaction between the first neutron 210 and the first portion 200a, illustrated at 212, generates a reaction product 214. This reaction product 214 can then travel through the other portions 200b-i and layers of residual stress reduction material 202 to reach a layer of detector material 208. In another example, a second neutron 220 travels through one or more portions (e.g., portions 200a-c) and one or more layers of residual stress reduction material 202 before interacting with a portion 200d of the layer of converter material 200. The interaction between the second neutron 220 and the portion 200d, illustrated at 222, generates a reaction product 224. This reaction product 224 can then travel through the other portions 200e-i and layers of residual stress reduction material 202 to reach the layer of detector material 208.

Any suitable material may be used to form the layer of residual stress reduction material. In order for a neutron and/or a reaction product to travel through the layer of residual stress reduction material without interacting therewith, the stress reduction material can comprise material with a neutron interaction cross-section that is below a threshold value. For instance, the residual stress reduction material can comprise aluminum.

The neutron detector 100 may yet further include one or more adhesion layers that can be used to adhere a layer of converter material to a layer of bonding material. FIG. 2 illustrates an exemplary neutron detector 100 which includes an adhesion layer 206 between a layer of detector material 208 and a portion 200i of a layer of converter material. Any number of adhesion layers may be employed in the neutron detector 100. Any suitable material may be used to form the adhesion layer, one example being titanium.

The neutron detector 100 may also include one or more cap layers that can be employed to prevent oxidation of a layer of converter material. This cap layer can be attached, e.g. via sputtering, to an open surface of the layer of converter material. FIG. 2 illustrates an exemplary neutron detector 100 that includes an exemplary cap layer 204. Any number of cap layers may be used in the neutron detector 100. Further, any suitable material may be employed to form the cap layer, one example being titanium.

Figure 3:
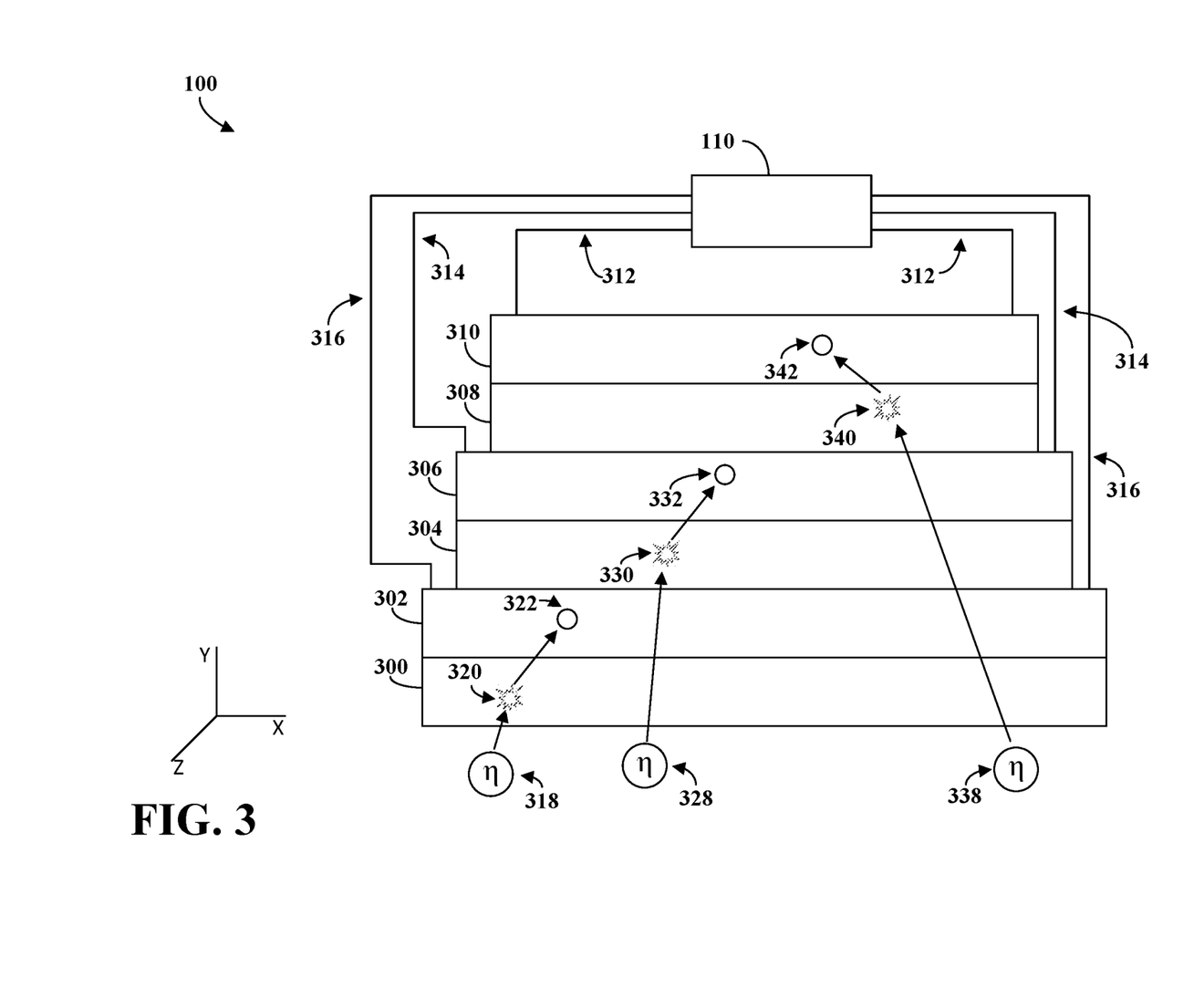
FIG. 3 illustrates yet another exemplary neutron detector.

The size of each layer in the stack of layers in the neutron detector 100 can be similar (FIG. 1) and/or can vary. For instance, as illustrated in FIG. 3, the stack of layers can comprise tiers of different sizes. Each tier can include one or more layers of converter material, detector material, residual stress reduction material, adhesion material, and/or cap material. For example, a first tier in FIG. 3 comprises a layer of converter material 300 and a layer of detector material 302; a second tier in FIG. 3 comprises a layer of converter material 304 and a layer of detector material 306; and a third tier in FIG. 3 comprises a layer of converter material 308 and a layer of detector material 310.

In the illustrated embodiment, each tier is smaller than a preceding tier in the stack of layers 300-310, such that the stack of layers 300-310 looks similar to a tiered cake structure. For example, the layer of converter material 300 can have a surface that has a first surface area and the layer of converter material 304 can have a second surface area that is smaller than the first surface area for the same surface. Further, the layer of converter material 308 can have a third surface area that is smaller than both the first surface and the second surface area for the same surface.

This tiered structure can result in more room on a surface of a layer of detector material for electronically coupling the layer of detector material to the ROIC 110. For instance, this tiered structure results in a larger surface area of the layer of detector material 302 being available for attaching leads thereon to electronically couple the layer of detector material 302 to the ROIC 110, as schematically illustrated by lines 316. Similarly, the tiered structure results in a larger surface of the layer of detector material 306 being available for attaching leads thereon to electronically couple the layer of detector material 306 to the ROIC 110, as schematically illustrated by lines 314. The layer of detector material 310 can also be electronically coupled to the ROIC 110, as schematically illustrated by lines 312.

In the illustrated embodiment, a first incoming neutron 318 interacts with the layer of converter material 300 while a second incoming neutron 328 and a third incoming neutron 338 passes through the layer of converter material 300 undetected. The interaction between the first neutron 318 and the layer of converter material 300, illustrated at 320, generates a reaction product 322 that can then be detected by the layer of detector material 302. Due to the stacked nature of the neutron detector 100, the second neutron 328 and/or the third neutron 338 may be detected by one of the subsequent layers. For instance, the second neutron 328 interacts with the layer of converter material 304, illustrated at 330, while the third neutron 338 passes through the layer of converter material 304 undetected by that layer instead interacting with the layer of converter material 308, illustrated at 340. These interactions each generate a reaction product 332 and 342, respectively, which are then detected by the layer of detector material 306 and the layer of detector material 310, respectively. The ROIC 110 can then output a value indicative of the first neutron 318 interacting with the layer of converter material 300, the second neutron 328 interacting with the layer of converter material 304, and/or the third neutron 338 interacting with the layer of converter material 310.

Each layer of converter material, detector material, residual stress reduction material, adhesion material, and/or cap material can comprise any suitable thickness. Each layer of similar material (e.g., converter material, detector material, etc.) in the neutron detector 100 can have a similar thickness and/or the thickness may vary for different layers of similar material in the neutron detector 100. In an exemplary embodiment, one or more layers of converter material in the neutron detector 100 is at least 2.4 microns thick. In another embodiment, one or more layers of detector material in the neutron detector 100 is at least 50 microns thick. The thickness of a layer may depend on the material used in that layer. In an embodiment, the overall thickness of the stack of layers can be approximately 4 mm.

Figure 4:
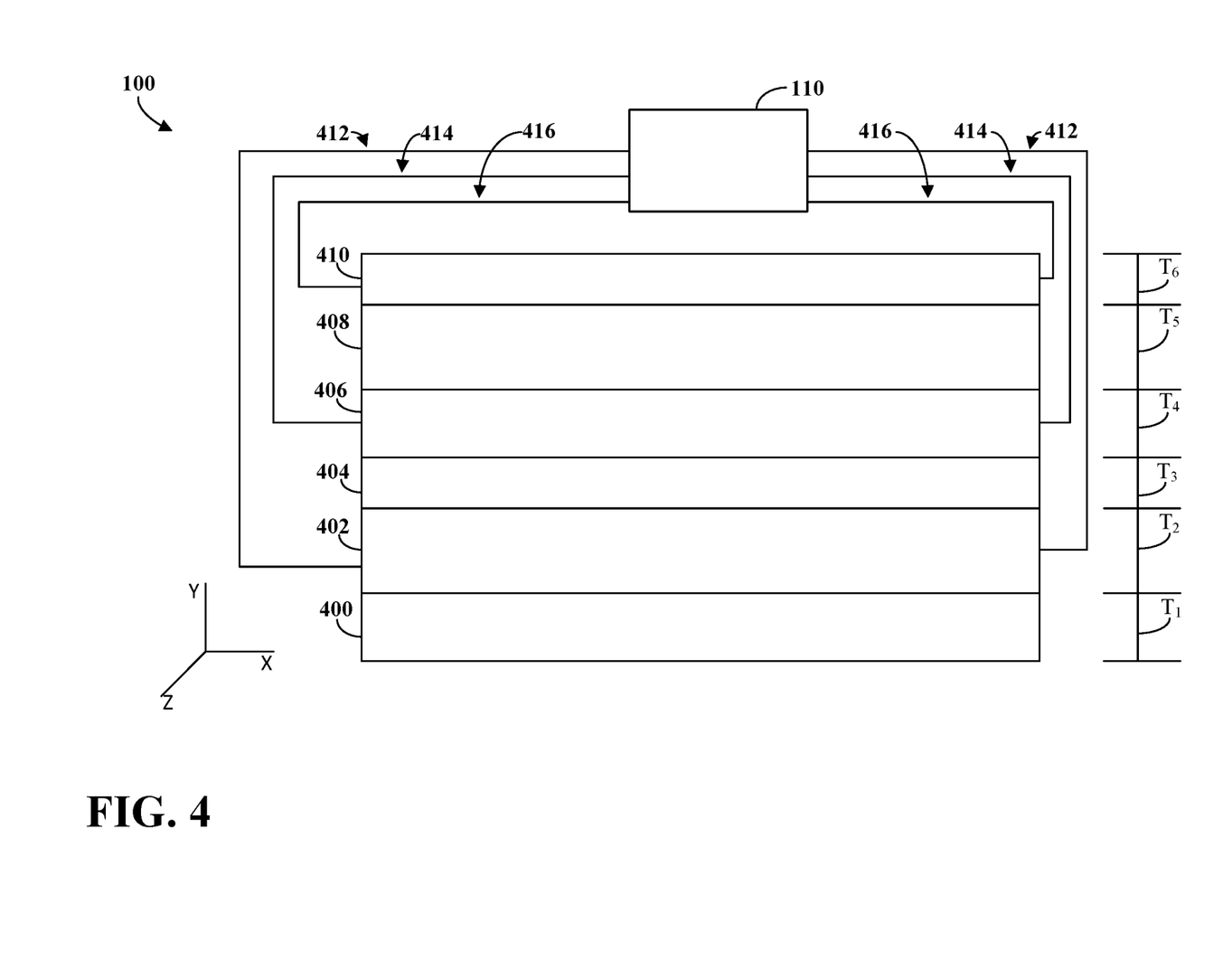
FIG. 4 illustrates a further exemplary neutron detector.

FIG. 4 illustrates an embodiment with varying thicknesses. In the illustrated neutron detector 100, a first layer of converter material 400 has a thickness $T_1$ while a second layer of converter material 404 has a thickness $T_3$ that is smaller than $T_1$ and a third layer of converter 408 material has a thickness $T_5$ that is larger than $T_1$. Similarly, a first layer of detector material 402 has a thickness $T_2$ while a second layer of detector material 406 has a thickness $T_4$ that is smaller than $T_2$ and a third layer of detector material 410 has a thickness $T_6$ that is smaller than both $T_4$ and $T_2$. Each of the first layer of detector material 402, the second layer of detector material 406, and the third layer of detector material 410 can be electronically coupled to the ROIC 110, as illustrated schematically by lines 412, 414, and 416, respectively.

The neutron detector 100 may yet further include a neutron moderator configured to prime an incoming neutron for interaction with a layer of converter material. The incoming neutron can be primed in any suitable manner, for instance by lowering the neutron's energy. In one example, an incoming neutron is converted, via the neutron moderator, into a thermal neutron for interaction with one or more layers of converter material in the neutron detector 100. The neutron moderator may be placed at any suitable location in the neutron detector 100. In one embodiment, the neutron moderator surrounds the stack of layers in the neutron detector 100.

Figure 5:
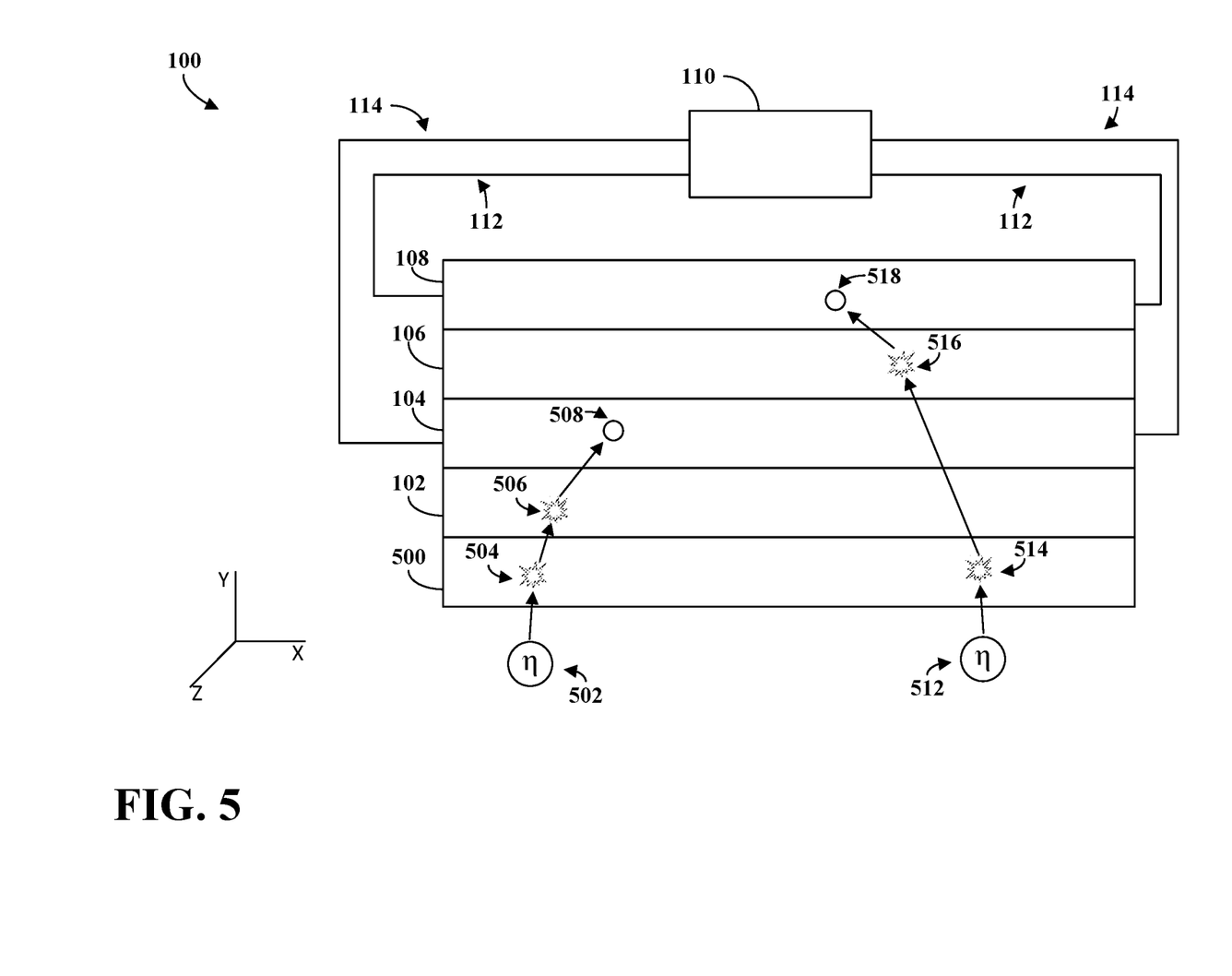
FIG. 5 illustrates a yet further exemplary neutron detector.

In another embodiment, illustrated in FIG. 5, a neutron moderator 500 is placed at one end of a stack of layers 102-108. A first incoming neutron 502 is primed for detection via the neutron moderator 500, as illustrated at 504. The primed neutron can then interact with the first layer of converter material 102, illustrated at 506, producing a reaction product 508 that can then be detected by the layer of detector material 104. A second incoming neutron 512 can also be primed via the neutron moderator 500, as illustrated at 514. The primed neutron can then travel through the layer of converter material 102 undetected and instead interact with a subsequent layer of converter material (e.g., layer of converter material 106), illustrated at 516, producing a reaction product 518 that can then be detected by the layer of detector material 108. The ROIC 110 can then output a value indicative of the first primed neutron interacting with the layer of converter material 102 and/or the second primed neutron interacting with the layer of converter material 106.

In the illustrated embodiments, a cross-section taken along the Z-axis for each layer of the neutron detector 100 has a rectangular shape. However, the cross-section taken along the Z-axis for each layer can have any suitable shape (e.g., circular, ellipsoidal, ovular, triangular, square, polygonal, etc.) and different layers in the stack of layers may have different shapes. Further, a cross-section taken along the X-axis, the Y-axis, and/or any axis for each layer can have any suitable shape (e.g., circular, ellipsoidal, ovular, triangular, rectangular, square, polygonal, etc.). For example, a cross-section of a layer taken along the Y-axis can have circular shape with a 6" or 8" diameter.

Figure 6:
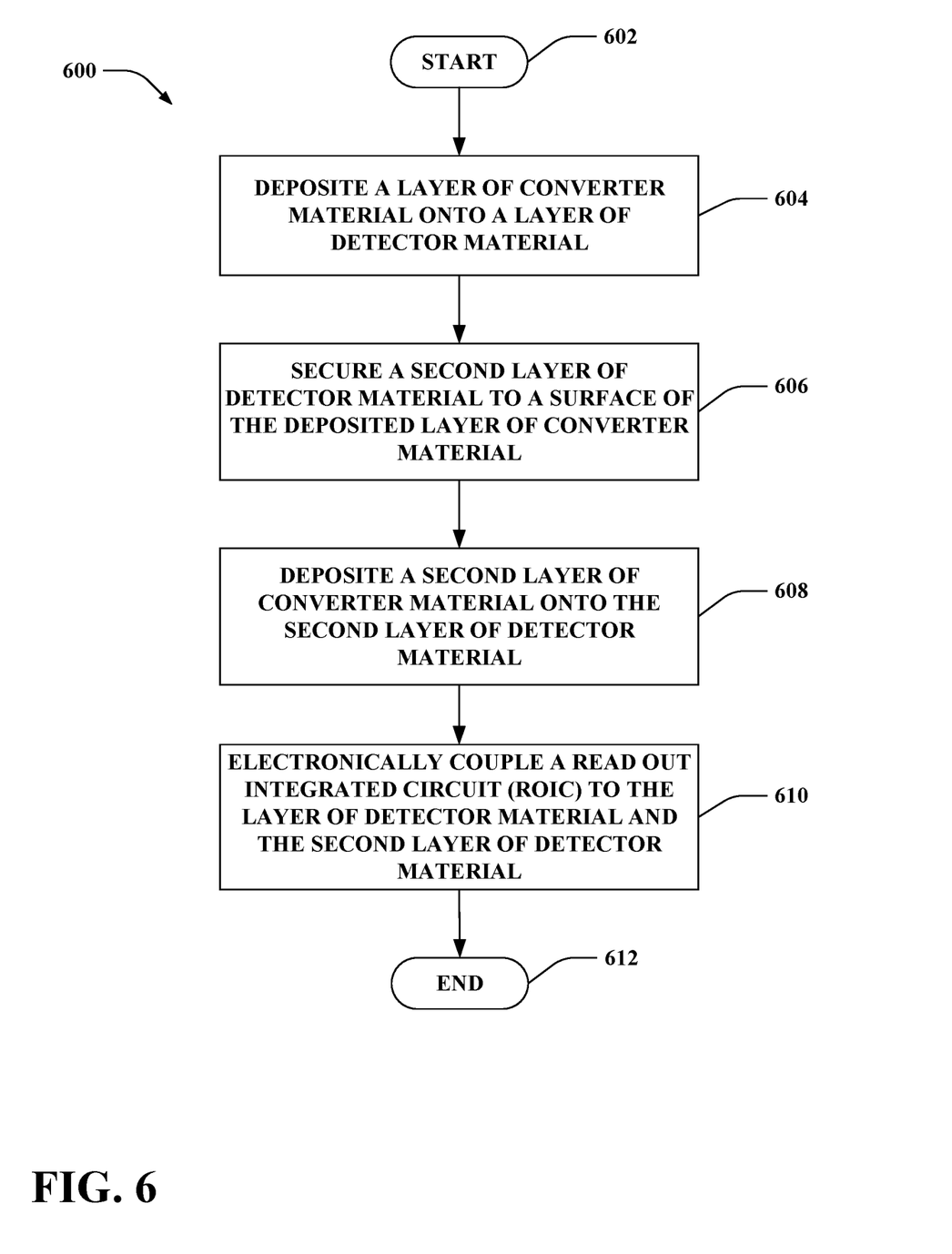
FIG. 6 is a flow diagram that illustrates an exemplary methodology for forming a neutron detector.

FIG. 6 illustrates an exemplary methodology relating to assembling a neutron detector. While the methodology is shown as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement a methodology described herein.

Referring now to FIG. 6, an exemplary methodology 600 for assembling a neutron detector is illustrated. The methodology 600 starts at 602, and at 604, a layer of converter material is deposited onto a layer of detector material. At 606, a second layer of detector material is secured to a surface of the deposited layer of converter material. At 608, a second layer of converter material is deposited onto the second layer of detector material. In one embodiment, the second layer of converter material is deposited onto the second layer of detector material after the second layer of detector material is secured to the surface of the deposited layer of converter material. In another embodiment, layer of converter material is deposited onto the layer of detector material, the second layer of converter material is deposited onto the second layer of detector material, and then the second layer of detector material is secured to the surface of the deposited layer of converter material. At 610, a read out integrated circuit (ROIC) is electronically coupled to the layer of detector material and the second layer of detector material. A value output by the ROIC is indicative of a neutron interacting with at least one of the layer of converter material or the second layer of converter material. The methodology 600 concludes at 612.

In an embodiment of the methodology 600, the step of depositing the layer of converter material onto the layer of detector material can include depositing a first portion of the layer of converter material onto the layer of detector material, depositing a layer of residual stress reduction material onto the deposited first portion of the layer of converter material, and depositing a second portion of the layer of converter material onto the deposited layer of residual stress reduction material.

In another embodiment, the methodology 600 further includes a step of securing a neutron moderator onto the layer of detector material. The neutron moderator can be configured to prime neutrons for interaction with at least one of the layer of converter material or the second layer of converter material.

In a further embodiment of the methodology 600, the ROIC is coupled to the first layer of detector material by through-silicon vias. In a yet further embodiment of the methodology 600, the converter material comprises at least one of boron-10, lithium-6, gadolinium, or uranium.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A neutron detector comprising:
a plurality of layers of converter material;
a plurality of layers of detector material, wherein each layer of converter material is immediately adjacent to at least one layer of detector material, and further wherein each layer of detector material is immediately adjacent to at least one layer of converter material;
a plurality of separate and substantially planar layers of residual stress reduction material, wherein each of the plurality of separate and substantially planar layers of residual stress reduction material is interposed between corresponding portions of one of the plurality of layers of converter material; and
a read out integrated circuit (ROIC) that is electrically coupled to the plurality of layers of detector material, wherein a value output by the ROIC is indicative of a neutron interacting with a layer of converter material from amongst the plurality of layers of converter material.

2. The neutron detector of claim 1, wherein a layer of converter material from amongst the plurality of layers of converter material comprises at least one of boron-10, lithium-6, gadolinium, or uranium.

3. The neutron detector of claim 1, wherein a layer of detector material from amongst the plurality of layers of detector material comprises at least one of silicon, cadmium telluride, diamond-like carbon, gallium arsenide, or aluminum gallium nitride.

4. The neutron detector of claim 1, wherein the neutron interacts with the layer of converter material by nuclear reaction.

5. The neutron detector of claim 1, wherein each of the plurality of layers of converter material includes a respective plurality of separate and substantially planar layers of residual stress reduction material.

6. The neutron detector of claim 1, wherein a layer of residual stress reduction material from amongst the plurality of separate and substantially planar layers of residual stress reduction material comprises at least one of aluminum or a material with a neutron interaction cross-section below a threshold value.

7. The neutron detector of claim 1, wherein a first layer of converter material from amongst the plurality of layers of converter material comprises a first material and a second layer of converter material from amongst the plurality of layers of converter material comprises a second material, wherein the first material and the second material are different.

8. The neutron detector of claim 1, wherein a first layer of converter material from amongst the plurality of layers of converter material has a face with a first surface area, wherein a similar face on a second layer of converter material from amongst the plurality of layers of converter material has a second surface area that is smaller than the first surface area.

9. The neutron detector of claim 1, wherein the ROIC is coupled to a layer of detector material from amongst the plurality of layers of detector material by through-silicon vias.

10. The neutron detector of claim 1, wherein the value output by the ROIC is further indicative of a particle or photon generated by the layer of converter material from amongst the plurality of layers of converter material when interacting with the neutron.

11. The neutron detector of claim 1, wherein a layer of converter material from amongst the plurality of layers of converter material is 2.4 microns thick.

12. The neutron detector of claim 1, further comprising:
a neutron moderator configured to prime neutrons, by lowering energy of a neutron, for interaction with any layer of converter material from amongst the plurality of layers of converter material.

13. A method of forming a neutron detector, the method comprising:
depositing a layer of converter material onto a layer of detector material, the layer of converter material including a plurality of separate and substantially planar layers of residual stress reduction material, wherein each of the plurality of separate and substantially planar layers of residual stress reduction material is interposed between corresponding portions of the layer of converter material;
securing a second layer of detector material to a surface of the deposited layer of converter material;
depositing a second layer of converter material onto the second layer of detector material; and
electronically coupling a read out integrated circuit (ROIC) to the layer of detector material and the second layer of detector material, wherein a value output by the ROIC is indicative of a neutron interacting with at least one of the layer of converter material or the second layer of converter material.

14. The method of claim 13, wherein the step of depositing the layer of converter material onto the layer of detector material comprises depositing a first portion of the layer of converter material onto the layer of detector material, depositing a layer of residual stress reduction material onto the deposited first portion of the layer of converter material, and depositing a second portion of the layer of converter material onto the deposited layer of residual stress reduction material.

15. The method of claim 13, further comprising:
securing a neutron moderator onto the layer of detector material, wherein the neutron moderator is configured to prime neutrons for interaction with at least one of the layer of converter material or the second layer of converter material.

16. The method of claim 13, wherein the ROIC is coupled to the first layer of detector material by through-silicon vias.

17. The method of claim 13, wherein the converter material comprises at least one of boron-10, lithium-6, gadolinium, or uranium.

18. A neutron detector comprising:
a plurality of layers of boron-10, wherein each layer of boron-10 generates an alpha particle when a thermal neutron interacts with the layer of boron-10 by nuclear reaction, wherein each of the plurality of layers of boron-10 includes a respective plurality of separate and substantially planar layers of residual stress reduction material, wherein each of the plurality of separate and substantially planar layers of residual stress reduction material is interposed between corresponding portions of the respective one of the plurality of layers of boron-10;
a plurality of layers of silicon wafers each configured to detect presence of the alpha particle, wherein each layer of boron-10 is immediately adjacent to at least one layer of silicon wafer, and further wherein each layer of silicon wafer is immediately adjacent to at least one layer of boron-10; and
a read out integrated circuit (ROIC) that is electrically coupled by through-silicon vias to each of the plurality of layers of silicon wafers, wherein a value output by the ROIC is indicative of detection of the alpha particle by a layer of silicon wafer from amongst the plurality of layers of silicon wafers.

19. The neutron detector of claim 18, wherein each of the plurality of separate and substantially planar layers of residual stress reduction material includes aluminum.

20. The neutron detector of claim 18, wherein a layer of boron-10 from amongst the plurality of layers of boron-10 is 2.4 microns thick.

* * * * *